Dec. 24, 1940.  J. J. ETTINGER  2,226,306
INVALID LITTER
Filed Aug. 5, 1940  2 Sheets-Sheet 1
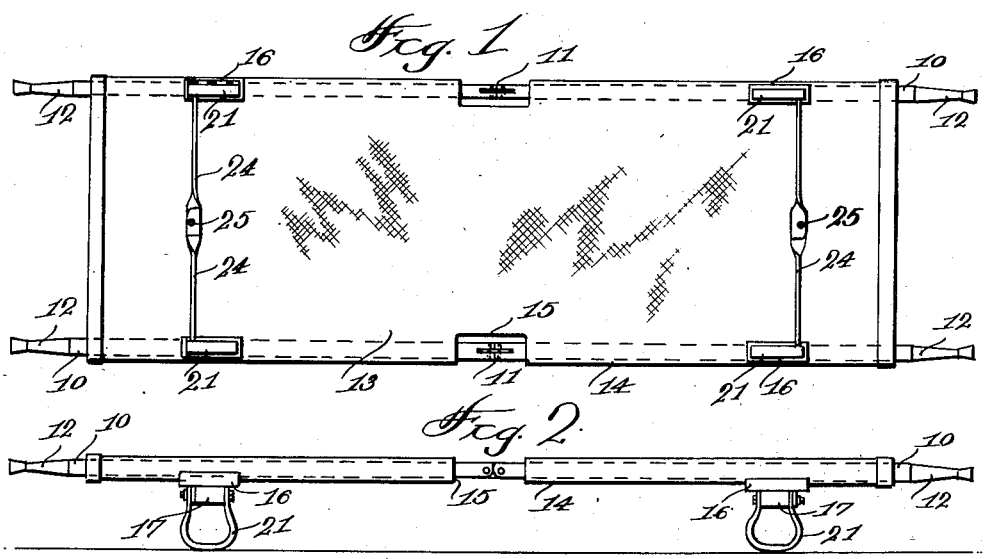
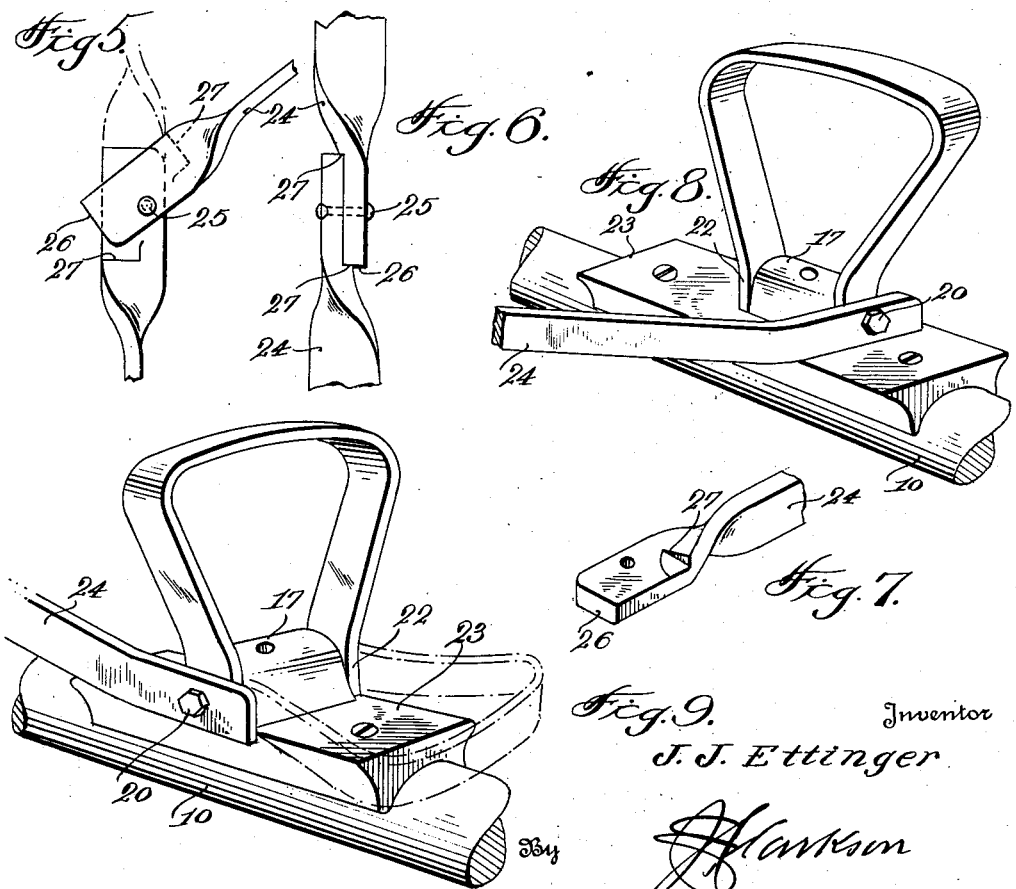
Inventor
J. J. Ettinger
By
Attorney Dec. 24, 1940.   J. J. ETTINGER   2,226,306
INVALID LITTER
Filed Aug. 5, 1940   2 Sheets-Sheet 2
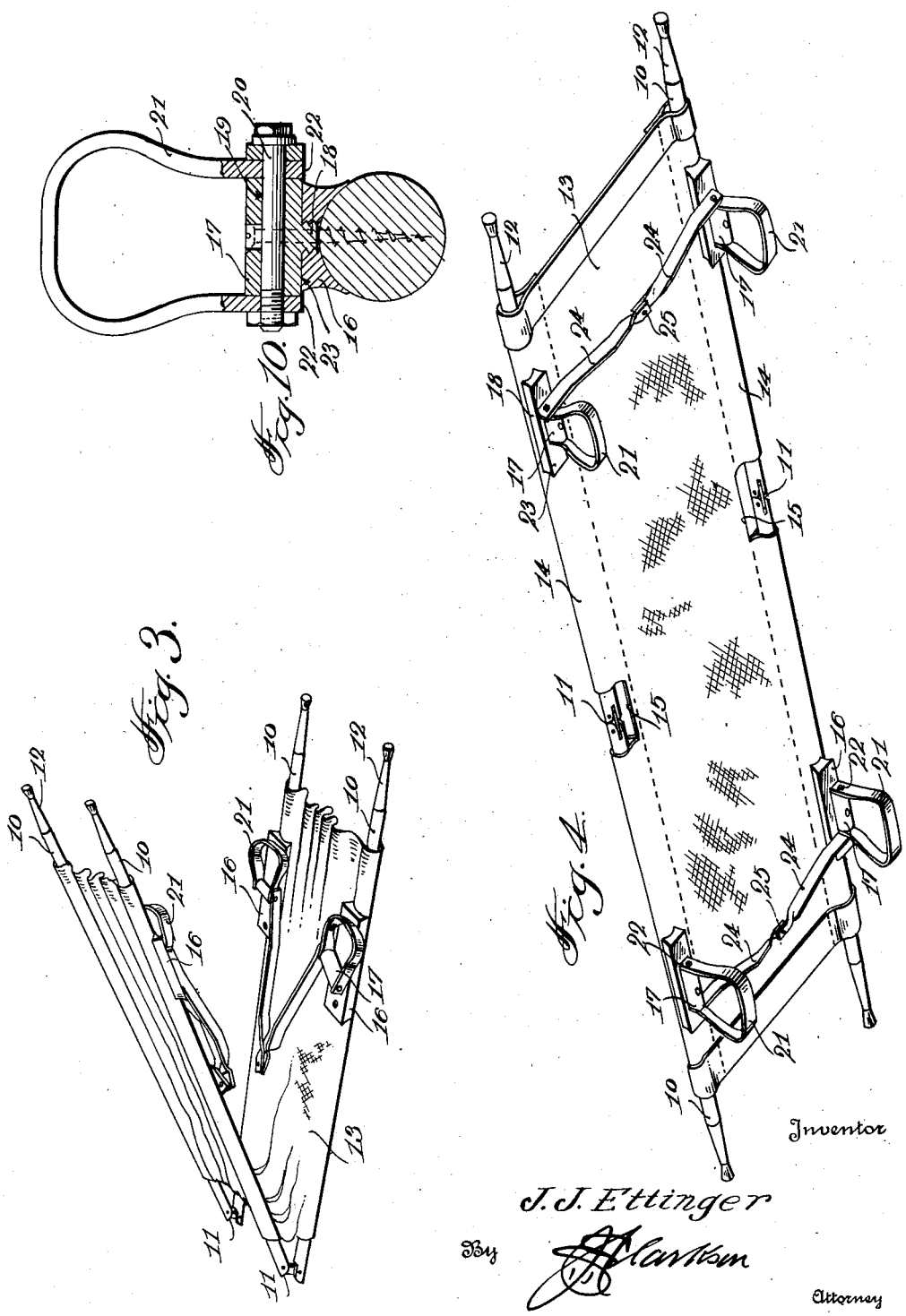
Inventor
J. J. Ettinger
By
Attorney Patented Dec. 24, 1940

2,226,306

UNITED STATES PATENT OFFICE 2,226,306

INVALID LITTER

Joe J. Ettinger, Warsaw, Ind.

Application August 5, 1940, Serial No. 351,489

6 Claims. (Cl. 5—82)

This invention relates to folding litters of the general type of that shown in my Patent No. 2,203,193 dated June 4, 1940.

One important object of the invention is to provide a novel arrangement of folding legs for such a litter.

A second important object of the invention is to provide a novel arrangement of stretcher bars for holding the litter in expanded position.

A third important object of the invention is to provide a novel combination of folding legs and stretcher bars wherein the legs are arranged to be supported against folding when the litter is expanded and are so positioned that they may be folded when the litter is collapsed.

With the above and other objects in view, as will be presently understood, the invention consists in general of certain novel details of construction and combination of parts hereinafter fully described, illustrated in the accompanying drawings, and particularly pointed out in the appended claims.

In the accompanying drawings, like characters of reference indicate like parts in the several views, and;

Figure 1 is a bottom plan view of the litter in expanded position.

Figure 2 is a side elevation thereof.

Figure 3 is a perspective view showing the litter partly collapsed and partly folded.

Figure 4 is a perspective view of the litter looking at its under side.

Figure 5 is a detail view showing the joint of a stretcher bar in partly folded position.

Figure 6 is a detail at right angles to Figure 5 but showing the joint when the stretcher bar is in fully open position.

Figure 7 is a perspective detail of one part of the stretcher bar joint and showing the stop shoulder of such joint.

Figure 8 is a perspective detail showing one of the legs in non-folding position.

Figure 9 is a view of the parts shown in Figure 8 but with the leg shown ready to fold in full lines and folded in broken lines.

Figure 10 is a view partly in section and partly in elevation showing the pole and leg arrangement.

In the embodiment of the invention as disclosed in the drawings the litter is provided with poles 10 each of which is provided centrally with a joint 11 of a type which is foldable only in one direction. These poles are provided at their ends with handles 12. The usual fabric strip 13 connects the poles 10, being provided with tubular side portions 14 to receive the poles. This fabric is cut away as at 15 to provide clearance for the joints 11.

Screwed or otherwise secured to the under side of each pole adjacent the handle portion thereof is a pair of saddles 16. On each of these saddles is mounted a swivelling block 17 having a pin 18 connected to the saddle whereon it is mounted. This pin 18 may be either a screw, rivet or other suitable means. Extending from end of each block is a bore 19 wherethrough passes a bolt 20 which projects at each end beyond the block 17. On each bolt 20 is mounted a stirrup-like leg 21, the arms of the leg being mounted on respective ends of the bolt. Each leg 21 has its arms provided with flat end faces 22 which, when the block 17 is turned to lie lengthwise of the saddle 16, rest on the flat face 23 of said saddle so that the leg cannot rotate on the bolt 20. However, the block 17, when turned to extend across the saddle 16, is of sufficient length to support the saddle legs (as shown in Figure 10) free of the saddle so that the leg may be turned down as in Figures 3 and 9.

In order to make provision for automatically shifting the position of the blocks 17 as the litter is collapsed and opened, each block 17 has pivoted thereto one end of a stretcher bar consisting of a pair of sections 24. These sections are connected centrally of the bar by a pivot 25 and one of these sections is provided with a square end 26 while the other section has a shoulder 27 against which the square end 26 engages when the litter is expanded thus preventing accidental collapse.

Figures 1, 4 and 8 show the relation of the parts when the litter is expanded and from these figures it will be seen that in expanded posittion the action of the stretcher bars is such that the blocks 17 lie longitudinally of the saddles. Similarly Figures 3, 9 and 10 show that when the litter is collapsed the blocks 17 lie transversely of the saddles so that the legs can be folded. Obviously when collapsed the litter can be folded on the joints 11 so that the under side of one half its length may lie against the under side of the other half of its length. To set the litter up from folded position it is merely necessary to unfold it, turn the legs down and spread the poles apart.

What I claim is:

1. In a collapsible litter including a pair of poles and a fabric connection between said poles, elongated saddles secured to the under side of said poles, an elongated swivel block pivoted on each saddle and having a length at least as great as the transverse dimension of the saddle and a leg having a pair of arms pivotally connected to opposite ends of said block, the ends of said arms being flat and resting on the lower face of the saddle upon the block being in position longitudinally of the saddle and means to control the movement of the swivel blocks on their saddles.

2. In a collapsible litter including a pair of poles and a fabric connection between said poles, elongated saddles secured to the under side of said poles, an elongated swivel block pivoted on each saddle and having a length at least as great as the transverse dimensions of the saddle, a leg having a pair of arms pivotally connected to opposite ends of said block, the ends of said arms being flat and resting on the lower face of the saddle upon the block being in position longitudinally of the saddle, and means for swivelling said blocks on said saddles upon collapsing and expanding movement of said litter.

3. In a collapsible litter including a pair of poles and a fabric connection between said poles, elongated saddles secured to the under side of said poles, an elongated swivel block pivoted on each saddle and having a length at least as great as the transverse dimension of the saddle, a leg having a pair of arms pivotally connected to opposite ends of said block, the ends of said arms being flat and resting on the lower face of the saddle upon the block being in position longinally of the saddle, and jointed stretcher rods each having its ends connected to a pair of said swivel blocks and acting to swing said swivel blocks on their pivots as the litter is moved between expanded and collapsed positions.

4. In a collapsible litter including a pair of poles and a fabric connection between said poles, elongated saddles secured to the under side of said poles, an elongated swivel block pivoted on each saddle and having a length at least as great as the transverse dimension of the saddle, and a leg having a pair of arms pivotally connected to opposite ends of said block, the ends of said arms being flat and resting on the lower face of the saddle upon the block being in position longitudinally of the saddle, said pivot blocks being of less length than said saddles and means to control the movement of the swivel blocks on their saddles.

5. In a collapsible litter including a pair of poles and a fabric connection between said poles, elongated saddles secured to the under side of said poles, an elongated swivel block pivoted on each of said saddles and having a length at least as great as the transverse dimension of the saddle, a leg having a pair of arms pivotally connected to opposite ends of said block, the ends of said arms being flat and resting on the lower face of the saddle upon the block being in position longitudinally of the saddle, said pivot blocks being of less length than said saddles, and means for swivelling said blocks on said saddles upon collapsing and expanding movement of said litter.

6. In a collapsible litter including a pair of poles and a fabric connection between said poles, elongated saddles secured to the under side of said poles, an elongated swivel block pivoted on each saddle and having a length at least as great as the transverse dimension of the saddle, a leg having a pair of arms pivotally connected to opposite ends of said block, the ends of said arms being flat and resting on the lower face of the saddle upon the block being in position longitudinally of the saddle, said pivot blocks being of less length than said saddles, and jointed stretcher rods each having its ends connected to a pair of said swivel blocks and acting to swing said swivel blocks on their pivots as the litter is moved between expanded and collapsed positions.

JOE J. ETTINGER.